US005484020A

United States Patent [19]
Cowan

[11] Patent Number: 5,484,020
[45] Date of Patent: Jan. 16, 1996

[54] REMEDIAL WELLBORE SEALING WITH UNSATURATED MONOMER SYSTEM

[75] Inventor: Kenneth M. Cowan, Sugar Land, Tex.

[73] Assignee: Shell Oil Company, Houston, Tex.

[21] Appl. No.: 233,150

[22] Filed: Apr. 25, 1994

[51] Int. Cl.$^6$ ..................................................... E21B 33/13
[52] U.S. Cl. ........................................... 166/295; 166/285
[58] Field of Search .................................... 166/278, 294, 166/295, 300, 285

[56] References Cited

U.S. PATENT DOCUMENTS

| | | |
|---|---|---|
| 2,191,312 | 2/1940 | Cannon . |
| 2,294,294 | 8/1942 | Grebe ........................................ 166/295 |
| 2,822,873 | 2/1958 | Harmsen et al. . |
| 3,114,419 | 12/1963 | Perry et al. . |
| 3,557,876 | 1/1971 | Tragesser ................................... 166/292 |
| 3,635,289 | 1/1972 | Van Dyk .................................... 166/295 |
| 3,857,443 | 12/1974 | Cole .......................................... 166/295 |
| 4,034,811 | 7/1977 | Sparlin et al. ............................ 166/295 |
| 4,600,057 | 7/1986 | Borchardt ................................. 166/295 |
| 4,722,976 | 2/1988 | Ceska ........................................ 525/301 |
| 4,817,721 | 4/1989 | Pober ........................................ 166/295 |
| 4,874,675 | 10/1989 | Ceska ........................................ 428/521 |
| 5,058,679 | 10/1991 | Hale et al. ................................ 166/293 |
| 5,090,478 | 2/1992 | Summers ................................... 166/278 |
| 5,363,918 | 11/1994 | Cowan et al. ............................ 166/295 |

FOREIGN PATENT DOCUMENTS 60078-906-A  5/1985  Japan .

Primary Examiner—George A. Suchfield

[57] ABSTRACT

A defective cemented annulus in a wellbore is repaired by injecting a water-soluble monomeric composition having polymerizable unsaturated groups. This allows repair of leaking cement jobs where the leakage occurs through very small imperfections. In accordance with the invention, a section of the casing above the area where formation fluid pressure may be entering is sealed off with packer devices, perforated or mill cut and a monomer solution is injected into the cemented annulus.

17 Claims, 1 Drawing Sheet

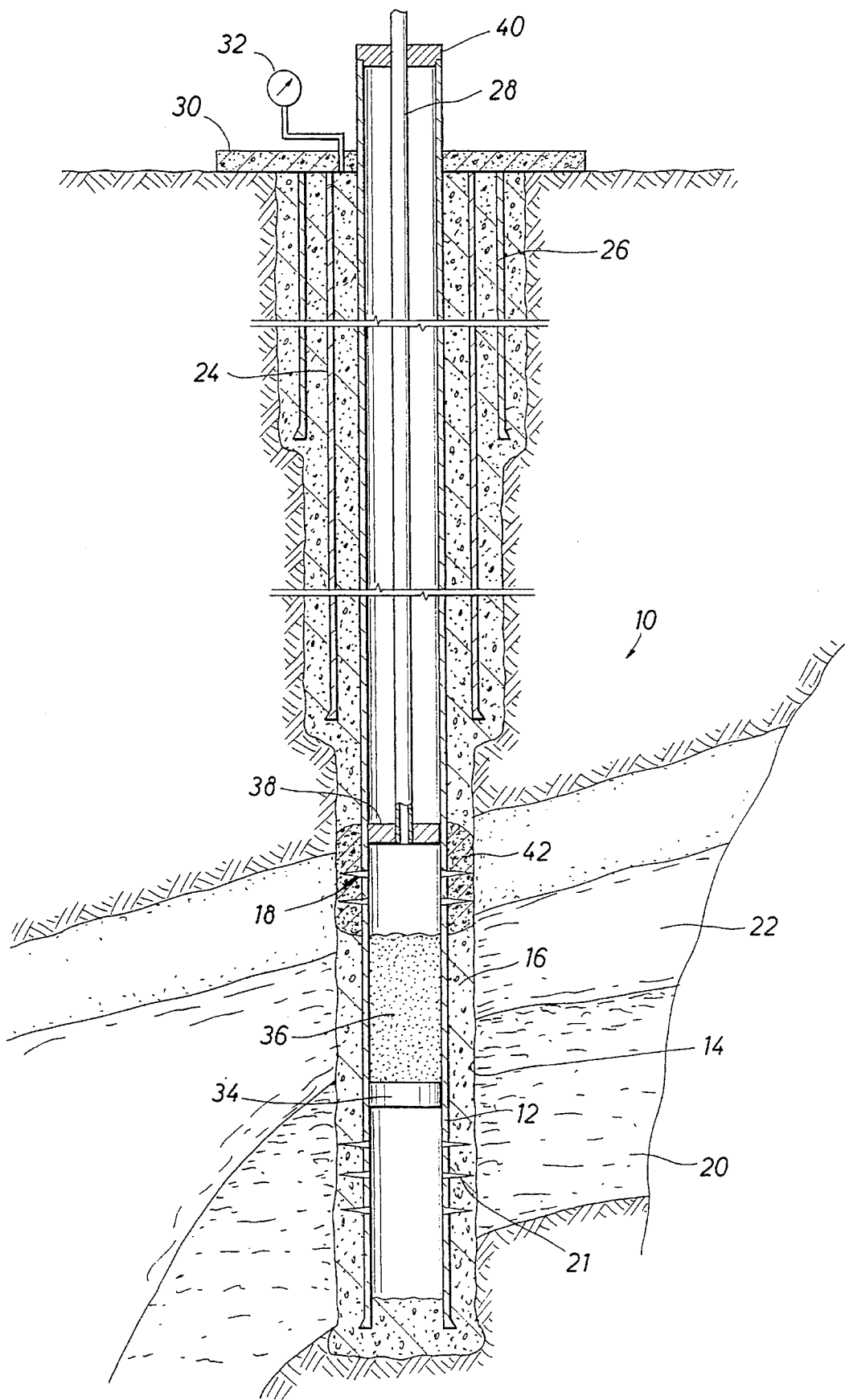

REMEDIAL WELLBORE SEALING WITH UNSATURATED MONOMER SYSTEM

BACKGROUND OF THE INVENTION

This invention relates to remedial wellbore cementing operations.

The general procedure of drilling an oil or gas well includes drilling a borehole using a drilling fluid. Subsequent to drilling the borehole, casing is run into the well preparatory to placing a cement in the annulus between the outside of the casing and the borehole wall. A good seal is not easy to obtain, however. When a poor cementing job results, it may be necessary to cut or perforate the casing and squeeze cement under high pressure through the cut or perforations into the annulus and try to fill the zones that were not properly cemented initially. Even this may not be successful and can result in eventual abandonment of the hole. For instance, if the cement is allowing unavoidable fluid flow through channels which are smaller than about $\frac{1}{1000}$ of an inch, squeeze cementing is not feasible even with microfine ground cement, yet this is exactly what frequently happens; channels such as cracks or worm holes having a dimension of about $\frac{5}{10,000}$-inch to $\frac{8}{10,000}$-inch result during the cementing or develop over time from the effect of salt water or acidizing. Even when conventional squeeze cementing is feasible, it frequently requires milling cuts into the casing which is more expensive than simply perforating.

Polymers are broadly known for use in oilfield drilling and production operations. Clarke, U.S. Pat. No. 4,897,119 (Jan. 30, 1990) discloses using a small amount of a low molecular weight polymer as a dispersant for blast furnace slag in a cement slurry.

Novak, U.S. Pat. No. 4,547,298 (Oct. 15, 1985) and Novak, U.S. Pat. No. 4,760,882 (Aug. 2, 1988), disclose primary cementing using a drilling fluid containing a polymeric material which is hardened with a chemical initiator and, optionally, radiation. Perry et al, U.S. Pat. No. 3,114,419 (Dec. 17, 1963) discloses radiation copolymerization in a wellbore of an alkylidene bisacrylamide and an ethylenic monomer as an improvement over chemical polymerization initiators.

Ionomers are known polymeric compositions which have been available since the 1950's. In recent years they have found a utility in applications such as tooth fillings as described, for instance, in Japanese patent 85-144069/24 (04.05.85).

SUMMARY OF THE INVENTION

It is an object of this invention to effectively repair wellbore cementing jobs that exhibit excessive permeability to fluid flow.

It is a further object of this invention to seal wellbore cement jobs that exhibit fluid leakage through channels too small to repair by squeeze cementing even using microfine ground cement.

It is yet a further object of this invention to repair a newly cemented well which exhibits permeability to fluids.

It is yet a further object of this invention to repair a wellbore cement job that has deteriorated over time.

It is still yet a further object of this invention to repair a wellbore cement job without the necessity to mill cut the casing.

In accordance with this invention there is provided a method for repairing a cemented annulus comprising injecting a water-soluble monomer having at least one polymerizable unsaturated group into said cemented annulus.

BRIEF DESCRIPTION OF THE INVENTION

In the FIGURE, forming a part hereof, there is shown in schematic form a cross section of a cemented annulus repaired in accordance with this invention.

DETAILED DESCRIPTION OF THE INVENTION

The present invention provides an inexpensive technique capable of repairing defective cement jobs, including cement jobs which cannot be repaired by conventional means, and thus the invention can allow saving a well that would otherwise have to be abandoned.

Definitions

By "water-soluble" as it refers to the monomer is meant a monomer having at least some water solubility and is intended to encompass both completely soluble monomers in that they will dissolve essentially completely in water under the temperature and concentration conditions employed as well as partially soluble monomers of sufficient solubility that at least 5 grams will dissolve in 100 grams of water at room temperature.

The term "pipe" means either a casing or a liner.

The term "primary cementing" refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

As used herein "down" or "bottom" as it relates to a drill string or casing means in a direction toward the farthest reach of the borehole even though in some instances the borehole can be disposed in a horizontal position. Similarly, "up" or "top" means back toward the beginning of the borehole.

By "barrel" is meant a standard 42-gallon petroleum barrel.

Monomers

The water-soluble monomer component can be any polymerizable component with a terminal unsaturated group. Generally, it is an ester of the formula:

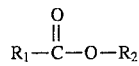

where $R_1$ is an unsaturated aliphatic carbon compound such as an alkene or alkyne having at least one multiple (double or triple) bond between adjacent carbons that may be related to reduce the multiple bond where $R_2$ is a hydrogen or saturated or unsaturated aliphatic carbon compound or the monomer may be the salt of an ester:

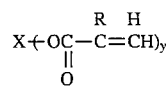

where X is a polyvalent metal or polyvalent organic group, R is H or a 1–3 carbon atom allyl group, and y is an integer equal to the valence of X. The ester can hydrolyze to the acid on contact with water.

Suitable water-soluble monomers include polyfunctional unsaturated organic acid esters such as: polyethylene glycol dimethacrylate, polyethylene glycol diacrylate, and highly alkoxylated triacrylates such as ethoxylated, ethoxylated and propoxylated triacrylates; and salts of polyfunctional unsaturated organic acids such as zinc diacrylate, modified zinc diacrylate, scorch retarded and modified zinc diacrylate, zinc dimethacrylate, scorch retarded zinc dimethacrylate and zinc monomethacrylate. The zinc compounds are preferred, but it is also suitable to use other alkali or transition metals, including the calcium, magnesium and aluminum salts. The starting monomers can be those sold by the Sartomer Company of Exton, Pa., under the trade name "SARTOMER 252", "SARTOMER 344", "SARTOMER 454", "SARTOMER 9020", or "SARTOMER 9035". In one embodiment, the monomer can consist essentially of a member selected from (1) metal salts of unsaturated organic acids (2) polyethylene glycol acrylates and (3) polyethylene glycol methacrylates.

The molecular weight of the monomers can vary widely so long as the monomers are water-soluble.

Salts of unsaturated, organic acids broadly include monovalent as well as polyvalent metal salts as depicted hereinbelow.

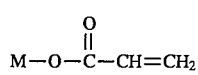

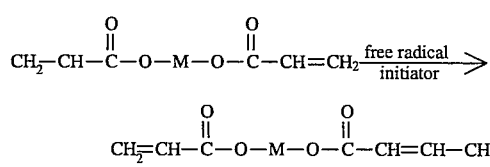

-continued

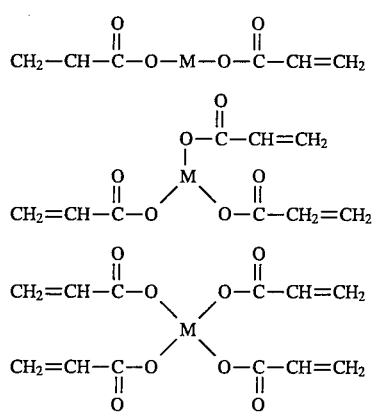

Thus M can be a mono, di, tri, tetra or penta or higher valent metal ion from a basic metal oxide or salt which will react with the acid to form the neutralized acid salt. The unsaturated organic acid can be acrylic or methacrylic for example. The starting materials can be the salt. Alternatively, the acid can be used and neutralization carried out in the system after which the unsaturated salt is polymerized.

Polymerization

While not wishing to be bound by theory, applicants believe the reactions are as follows. The polymerization of unsaturated organic acid salts is depicted hereinbelow.

1. monovalent metal salt or complex

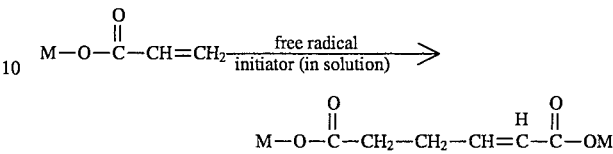

Further reaction can occur at the

bond as follows:

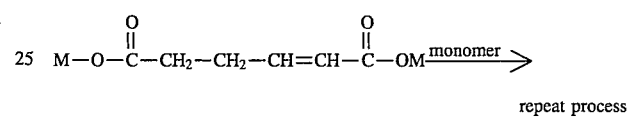

$M=Na^{+}$, $Li^{+}$, $NH_4^{+}$, for instance.

2. divalent metal salt or complex

This process can be repeated until all double bonds are reacted. This can result in some branching along the chain as below.

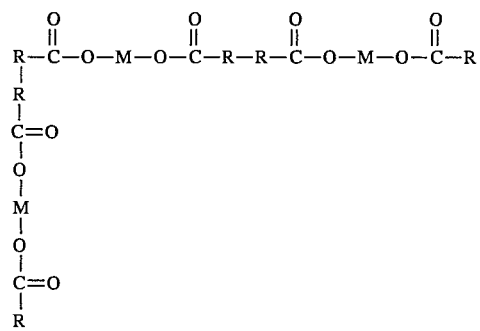

wherein R is the remnant of a monomer unit.

At the internal R groups, branching can occur at the unsaturated bonds.

3. Difunctional organic acid ester, no branching

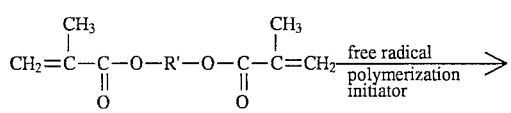

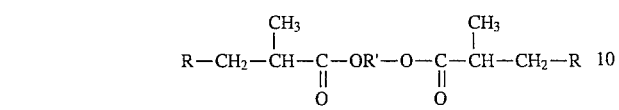

wherein R' is a polyethylene oxide unit —(—CH$_2$—CH$_2$—O—)$_m$— and R is the remnant of a monomer unit. The process continues until all unsaturated carbon bonds are reacted to saturation or until initiation by available free radicals ends the polymerization process.

4. Difunctional organic acid esters, branching

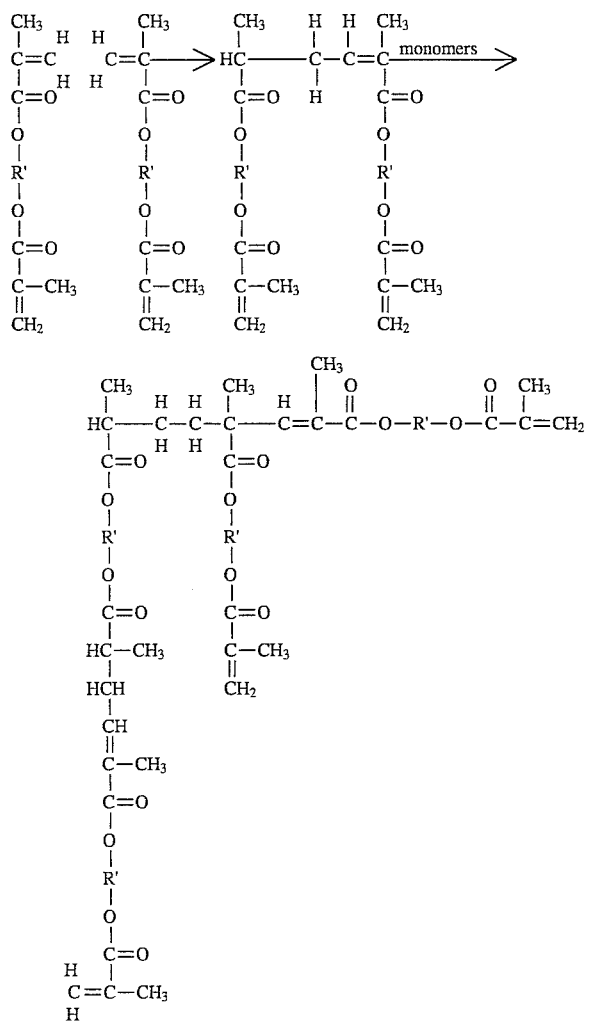

The weight average molecular weights of the final polymer can range from 500 to 5,000,000 but preferably will be in the range of 1,000 to 750,000, most preferably 5,000 to 250,000.

Polymerization Catalyst

A polymerization catalyst or initiator is generally, but not always, used to facilitate the polymerization of the unsaturated monomer. Suitable catalysts include peroxides such as hydrogen peroxide, benzoyl peroxide and persulfates such as sodium and ammonium persulfate.

The catalysts are generally used in an amount within the range of 0.05 to 10 wt %, preferably 0.3 to 6 wt %, more preferably 1 to 5 wt % based on the weight of monomer.

Ratio of Ingredients

The monomer can be injected into the wellbore annulus neat or in solution in water. Generally, it will be in an aqueous solution, an alcohol solution, or in an alcohol-containing aqueous solution. Concentration of the monomer in the solution can vary from about 5 to about 100 volume percent to 10 to 95 volume percent, more preferably 25 to 75 volume percent based on the volume of final solution.

DETAILED DESCRIPTION OF THE DRAWING

Referring now in detail to the drawing, there is shown an oil well 10 having a production casing 12. The annulus between the inside walls of borehole 14 and the outside walls of casing 12 contains cement 16. Perforations 18 have been made, for instance with a perforating tool which has been lowered into the casing to fire projectiles or powerful jets of gas generated in small explosions to penetrate the casing and cement sheath. If desired, a small amount of acid may be used to wash the perforations to remove pulverized debris and enhance the fluid-carrying capacity of the perforations and adjacent formation. As can be seen, the wellbore extends on down into oil-bearing formation 20 which is accessed by means of perforations 21. Above oil-bearing formation 20 is high pressure gas-bearing formation 22. Toward the upper portion of the wellbore is intermediate casing 24 and conductor casing 26. Drill string 28 is shown disposed within the production casing. Prior to repairing the cement job in accordance with this invention, gas from high pressure zone 22 could migrate through defective cement 16 and up the annular cement column where it is stopped by cement slab 30, the pressure being measured by pressure gauge 32. It is essential to know if the cement job is inadequate since it would be unsafe to either allow the gas to simply vent to the atmosphere or to allow the pressure to build up to the point where it might collapse the casing. Preparatory to the repair, an isolation tool such as bridge plug 34 is installed below the area to be repaired. Sand 36 is employed above the bridge plug in order to protect the working mechanism from the polymer to be introduced. An isolation tool such as packer 38 is deployed in casing 12 above the area where the borehole traverses high pressure gas-bearing formation 22. A cap 40 seals the portion of the casing 12 above packer 38. Monomer is then introduced through drill string 28 and forced under pressure out through perforations 18 into annular cement column 16 to form a zone 42 of impervious polymer-impregnated concrete. This prevents further flow of gas from zone 22 upward through the cement column 16. The zone to be sealed can be as little as 1 to 10, preferably 5 to 20, more preferably 10 to 100 feet, so long as it is disposed above the area where high pressure gas is entering.

Not only does the invention work successfully to seal defective cement jobs wherein the cracks or worm holes are smaller than 1/1000 of an inch, but the effectiveness of the seal is greater than would be thought possible. While Applicants do not wish to be bound by theory, it is believed that a chemical bond occurs across the double bonded oxygens to metal components in the cement and/or rock formations which form the surface of the borehole in some regions. For instance, the double bonded oxygens apparently can bond to calcium oxide and alumina, both ingredients of conventional cement and also sometimes ingredients in rock formations being traversed. More broadly, double bonded oxygens can bond to any metal compound which is a proton acceptor including other metal oxides such as magnesium MgO, ZnO or oxides of manganese.

The invention is of particular applicability in repairing defective Portland cement cementing jobs which either develop worm holes or cracks during formation or which became defective over time because of the action of salt and/or acids. The invention can also be used in conjunction with cement jobs carried out utilizing blast furnace slag, although in the case of blast furnace slag, the likelihood of imperfections is less.

EXAMPLE

An oil well of the general configuration of that shown in the drawing, having a casing newly cemented in place with Class H Portland cement was found to have unacceptably high leakage of formation gas. A rig was placed over the well and a mill cut was made in the casing in an effort to squeeze cement with Class H Portland cement. The results were unsuccessful, apparently because the porosity, while sufficient to allow unacceptably high volumes of gas transmission, was of such a dimension that the cement could not penetrate effectively. The pressure had developed by this time to the extent that it threatened to burst the casing, i.e., intermediate casing 24 was threatened with expanding into a weak area and bursting. It is believed the dimension of the worm holes and/or cracks was about 5/10,000 of an inch to 8/10,000 of an inch. A bridge plug was positioned below the zone of high pressure gas as shown in the FIGURE and about 25 feet of sand placed above the bridge plug to protect the working mechanism from the polymer. Thereafter, a drill string with a packer was inserted as shown in the FIGURE. A solution was prepared as follows:

3—53 gal. drums of "SARTOMER 252" a monomer sold by Sartomer Company of Exton, Pa.

2—53 gal. drums of propylene glycol (diluent)

1—42 gal. barrel of seawater 24 lbs. of sodium persulfate

These ingredients were mixed at 100° F. and pumped down the drill string under 1800 psig pressure to impregnate a region of the cement analogous to that shown by reference character 42 of the FIGURE. This operation took about 1 hour and pressure was maintained on the system for another 2 hours to allow complete polymerization and attachment of the resulting polymer across double bonds to metal sites. The packer was removed, fluid circulated down the drill pipe and up the annulus to flush out the sand, and the bridge plug was removed. The gauge showing annular gas pressure coming up the cement column indicated the pressure had been reduced from 1450 to 0, indicating a 100 percent successful operation.

While this Example was carried out using the mill cut that had already been made for the unsuccessful squeeze cement effort, equally good results could have been obtained by a much less expensive perforation of the casing with a perforating gun.

The repair job has been monitored for 10 months and continues to show a successful seal.

"SARTOMER 252" a monomer sold by Sartomer Company of Exton, Pa. is believed to be an ester of the following structural formula which, on contact with water, will hydrolyze as shown hereinbelow:

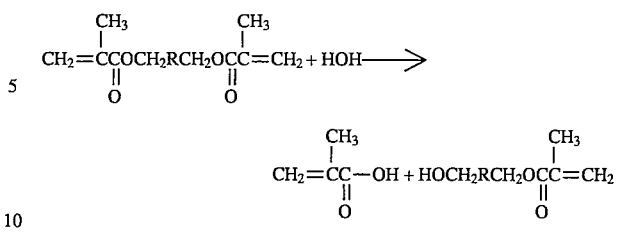

While this invention has been described in detail for the purposes of illustration, it is not to be construed to be limited thereby but is intended to cover all changes and modifications within the spirit and scope thereof.

What is claimed is:

1. A method for remedial cementing comprising:
    injecting a water-soluble composition comprising a monomeric component having polymerizable unsaturated groups into a cemented annulus between a pipe and a wellbore.

2. A method according to claim 1 wherein said monomer is dissolved in a medium comprising an alcohol and water.

3. A method according to claim 2 wherein said medium is propylene glycol and seawater.

4. A method according to claim 1 wherein said pipe is a production casing and said production casing is perforated prior to said injection to allow communication from the interior of said pipe to said cemented annulus.

5. A method according to claim 1 wherein said monomer is a polyethylene glycol methacrylate.

6. A method according to claim 1 wherein said wellbore traverses a zone of high formation gas pressure, a bridge plug is positioned in said pipe below said zone of high formation gas pressure, a packer is positioned in said pipe above said zone of high formation gas pressure and is attached to a drill string so as to allow said injection of said monomer through said drill string, said pipe being perforated in the region between said packer and said bridge plug.

7. A method according to claim 6 wherein sand is placed above said bridge plug prior to said injecting.

8. A method according to claim 1 wherein said composition comprises, in addition, a catalyst.

9. A method according to claim 8 wherein said catalyst is a peroxide.

10. A method according to claim 1 wherein in said monomeric component is represented by the formula:

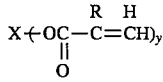

where X is a polyvalent metal or polyvalent organic group, R is H or a 1–3 carbon atom alkyl group and y is an integer equal to the valence of X.

11. A method according to claim 1 wherein said monomeric component is selected from the group consisting of zinc diacrylate, modified zinc diacrylate, scorch retarded and modified zinc diacrylate, zinc dimethacrylate, scorch retarded zinc dimethacrylate, zinc monomethacrylate, polyethylene glycol. dimethacrylate, polyethylene diacrylate, highly alkoxylated triacrylate.

12. A method according to claim 1 wherein said monomeric component is zinc dimethylacrylate.

13. A method according to claim 1 wherein said monomeric component is selected from the group consisting of polyethylene glycol dimethacrylate and highly alkoxylated triacrylate.

14. A method according to claim 1 wherein said cemented annulus is cemented with Portland cement.

15. A method according to claim 14 wherein said pipe is perforated to allow communication between said pipe and said cemented annulus, said monomeric composition comprises polyethylene glycol dimethacrylate, propylene glycol diluent, seawater and sodium persulfate.

16. A method according to claim 15 wherein said cemented annulus allows a gas pressure of at least 50 psig to reach a top level of said annulus and wherein said cementing pressure at said top level of said annulus is less than 10 psig.

17. A method according to claim 9 wherein said monomer is polyethylene glycol dimethacrylate, said monomer is dissolved in a propylene glycol and water mixture and said catalyst is sodium peroxide.

* * * * *